O. R. CHASE.
Lozenge Machine.
No. 39,196.
2 Sheets—Sheet 1.
Patented July 7, 1863.
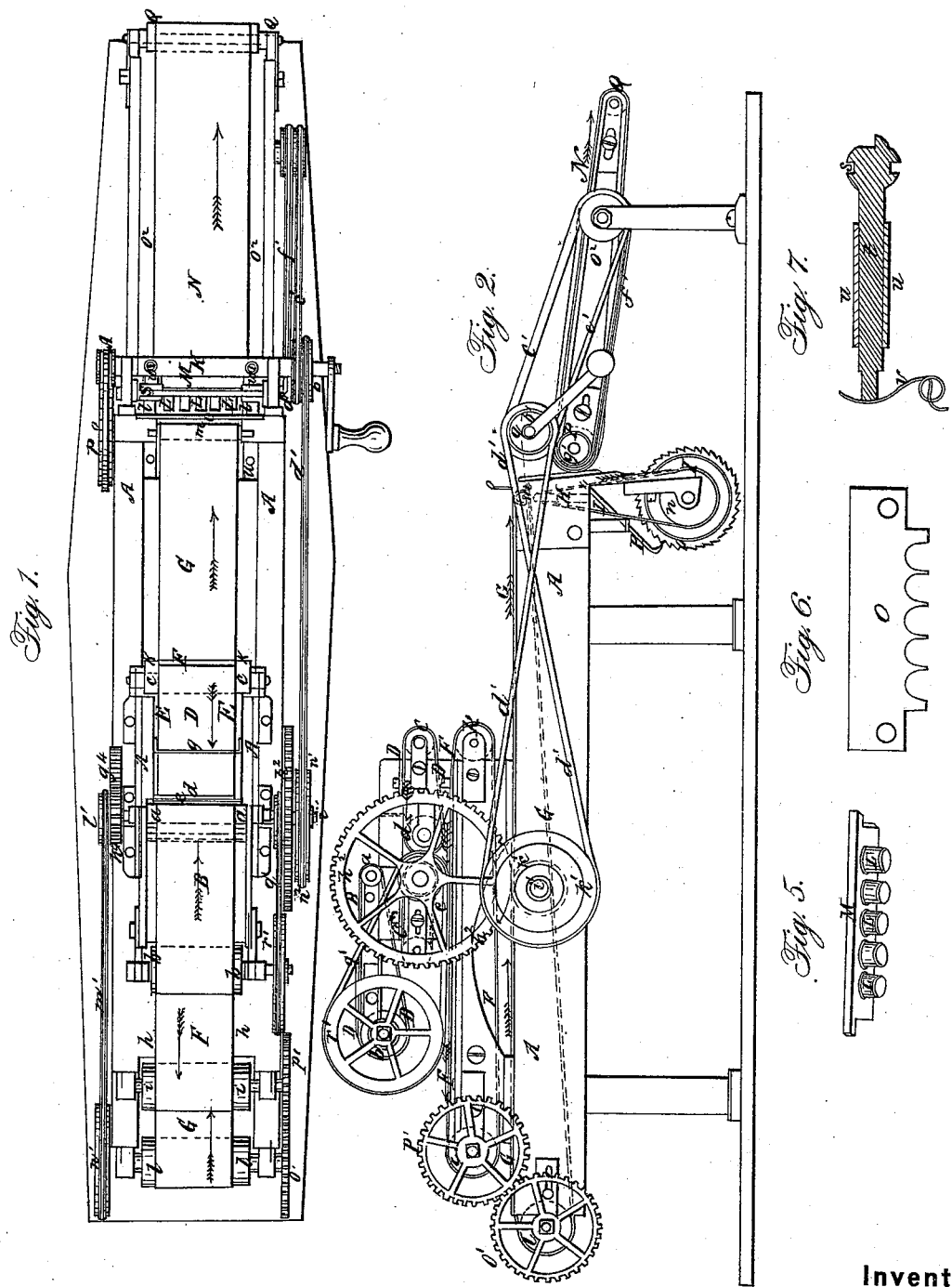
Witnesses:
Inventor:

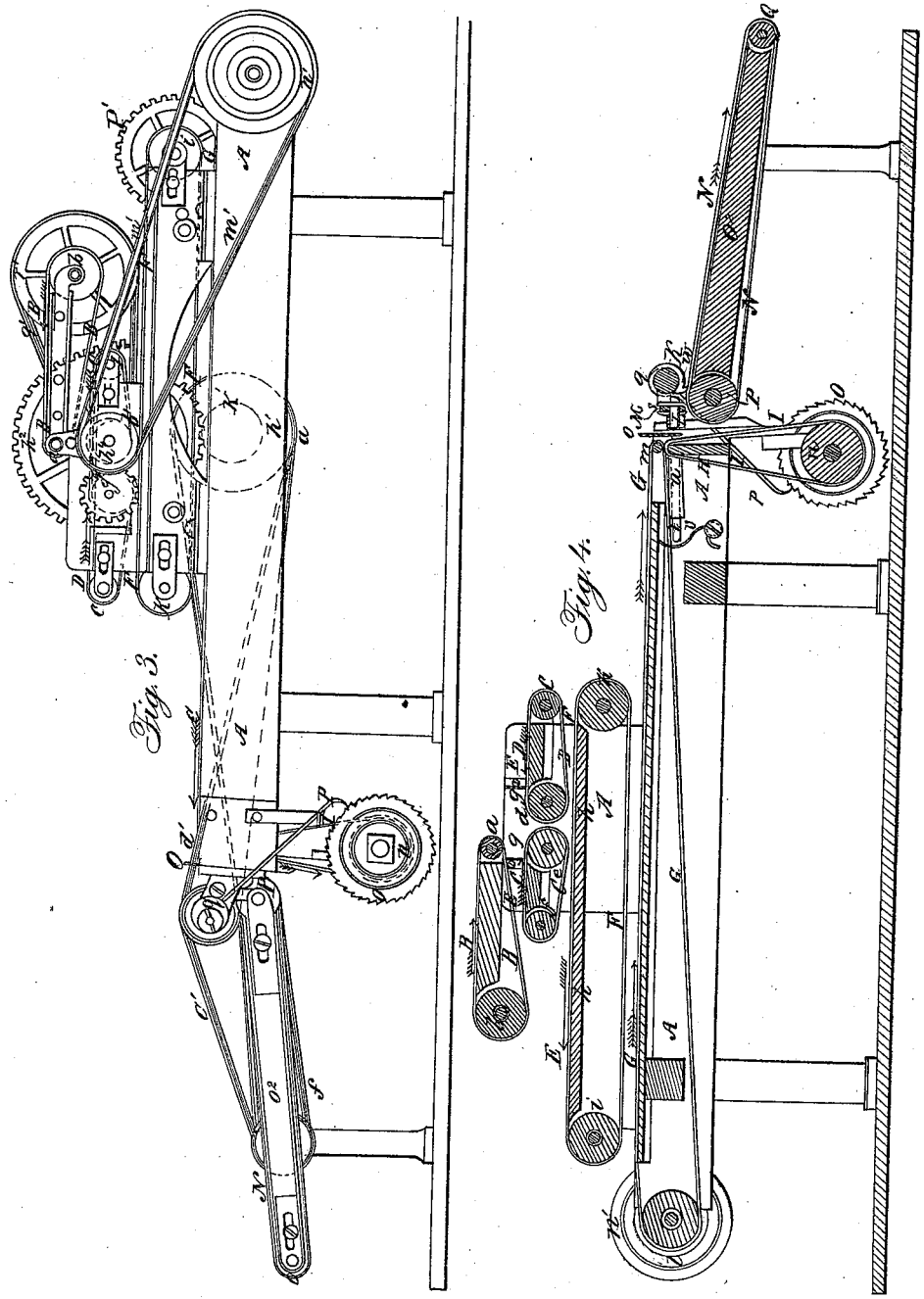

UNITED STATES PATENT OFFICE.

OLIVER RICE CHASE, OF BIRMINGHAM, COUNTY OF WARWICK, ENGLAND, ASSIGNOR TO CHASE & COMPANY.

IMPROVED MACHINE FOR MANUFACTURING LOZENGES.

Specification forming part of Letters Patent No. 39,196, dated July 7, 1863.

*To all whom it may concern:*

Be it known that I, OLIVER RICE CHASE, a citizen of the United States, and residing in Birmingham, in the county of Warwick and Kingdom of Great Britain, have invented an improved machine for manufacturing lozenges or various other articles from paste or dough; and I do hereby declare that the same is fully described and represented in the following specification and the accompanying drawings, of which—

Figure 1 is a top view, Figs. 2 and 3 side elevations, Fig. 4 a central and longitudinal section, of such machine. Fig. 5 is a perspective view of its cutters and their carrier-bar; Fig. 6, an elevation of the comb-plate which operates in connection with the cutters. Fig. 7 is a longitudinal section of one of the supporters of the cutter-carrier, such section being made to exhibit the spring and the socket of the supporter.

The nature of my invention or improvements consists in a combination and arrangement of an extra delivery-apron with the main delivery apron or carrier of the paste-reducing and sugaring apparatus, and with mechanism for stamping the lozenge from the paste, the object of the said extra delivery-apron, when used, as hereinafter set forth, with the main delivery-apron and the apparatus for reducing the paste and sugaring it on both sides, being to enable the sheet of paste to be seen on both of its sides or flat surfaces preparatory to its being subjected to the action of the cutters; also, in an arrangement and combination of the delivery-apron, the cutter-board, the cutters, and the lozenge-discharging apron, the same not only enabling the sheet of paste to drop vertically and fall by its own weight preparatory to and after being cut, but causing the cutters to discharge the lozenges in manner set forth on the discharging-apron or on boards placed thereon; also, in an arrangement and combination of a surface-changing apron with the cutter-board and the delivery-apron, the cutters, and the lozenge-discharging apron, as hereinafter specified; also, in an arrangement and combination of a comb-plate, or its equivalent, with the cutters and their stamping-board, or the device for supporting the paste or dough while it is being stamped.

In the drawings, A exhibits the frame of the machine, on the upper part of which there is a supplying or feeding endless apron, B, and two other endless aprons, C D, the three aprons being disposed with respect to each other and around drums or rollers $a\ b\ c\ d\ e\ f$, as shown in Figs. 1 and 4. The rollers $d$ and $e$, while they serve to give support to two of the aprons, operate with such to reduce the paste to a sheet of equal thickness while it may be passing between them. Furthermore, directly over each of the aprons C D there is a gage bar or plate, $g$, which, being arranged so as to extend from side to side of the frame of the machine and at a short distance above the apron, gages the thickness of sugar, which by the apron may be carried into contact with the sheet of dough or paste formed between the said two aprons C D. While the machine is at work a mass of powdered sugar is placed in the sugar-receptacle E, situated at the back of each gage-plate $g$. Directly underneath the said aprons C D is an endless delivery-apron, $f$, working around a supporting-board, $h$, and two rollers, $i\ k$, which are disposed as shown in Fig. 4. Furthermore, immediately below the apron F there is an extra delivering-apron, G, carried by two drums or rollers, $l\ m$. This latter apron is not only much longer than the apron F, but projects beyond both of the supporting-rollers of the latter, as shown in the drawings, the same being not only so that the sheet of paste, after being discharged from the apron F, may fall upon or be received by the apron G, but that it may be carried by it so far beyond the front roller of the apron F as to be capable of being inspected or readily seen, polished, and sugared in case its upper surface may need any more powdered sugar applied to any part of it preparatory to such part being carried in contact with the cutters. By means of the two delivery-aprons F and G all portions of both sides or opposite surfaces of the sheet of paste can be seen and examined before such portions may be made to pass across the cutter-board.

The several arrows shown in the drawings serve to indicate the directions of movements of the parts to which they are applied.

Below the front end of the delivery-apron G the cutter-board H is disposed with its face upright, or nearly so. A surface changing endless apron, I, is arranged so as to pass around and rest against the face of the cutter-board, as shown in Fig. 4, such apron being supported by the cutter-board and a drum, $n$. A ratchet-wheel, $o$, is fixed on the shaft of the roller $n$ and operated by a draw-pawl, $p$, whose upper part embraces an eccentric, $q$, carried by a cam-shaft, K, arranged as shown in the drawings.

In front of the cutter-board H a series of tubular cutters, L L L, is arranged, and so as to project from a supporting-bar, M, as shown in the drawings. Each tubular cutter extends through the bar, M, and is open at its opposite ends, in order that the lozenges received into the cutter at one end may be discharged at its other end and caused by their own gravity to fall upon an endless carrier or delivery-apron, N, arranged around a platform $O^2$ and two sustaining rollers, P Q, as shown in Fig. 4. Each end of the cutter bar M rests in a recess or socket, $s$, formed in the head of one of two slide-rods or sliders, $t\ t$, each of which is supported in a tubular socket or bearing, $a$, and so as to be capable of sliding in a direction longitudinally of the machine. A spring, $v$, is so disposed as to act against the rear end of the slider in manner to press such slider toward the cam-shaft K. Such shaft K is furnished with cams $w\ w$, which, during each revolution of the shaft, are caused to act against the front ends of the sliders, so as to move the sliders rearward and cause them to force the cutters into the paste and against the apron around the cutter-board.

The shaft K may be considered as the driving-shaft of the machine. It carries two grooved pulleys, $a'\ b'$, around which, respectively, two endless bands, $c'\ d'$, are made to work. One of the said bands, or the foremost one, $c'$, runs around a leading-pulley, about which another endless band, $f'$, works and transfers motion to a pulley, $g'$, fixed upon the shaft of the rearmost drum of the foremost delivering-apron, N, the same serving to put such apron in movement. A crossed belt, $d'$, also extends about a pulley, $h'$, fixed upon a shaft, $i'$, that carries a pinion, $k'$, which engages with a gear, $h^2$, fixed on the shaft of the compressing-roller $e$, and as the two compressing-rollers $d\ e$ are geared together by gears $g^4\ h^4$, arranged as shown in Figs. 1 and 3, they, with their endless or sugaring aprons, C D, receive motion when the shaft K is put in rotation. Furthermore, by means of a pulley, $l'$, fixed on the shaft of the rearmost compressing-roller, $e$, motion is at the same time imparted to an endless band, $m'$, that traverses about a pulley, $n'$, fixed on the shaft of the rearmost drum, $l$, of the extra delivering-apron G. By such means the said extra delivering-apron G will be put in operation. The shaft of the rearmost drum or roller carries a gear, $o'$, that engages with a gear, $p'$, fixed on the shaft of the rearmost drum of the main delivery-apron F, such apron being made to receive motion by means of such devices. The uppermost or feeding apron, B, is moved by means of an endless belt, $q'$, which traverses around two pulleys, $r'\ s'$, one of which is fixed on the shaft of the rearmost compressing-roller, $e$, while the other is carried by the shaft of the rearmost drum, $l$, of the feeding-apron.

Between the cutters L and the cutter-board H there is a perforated plate or comb, O. This comb has its teeth projecting down so as to pass between the cutters; or it may be a plate constructed with holes of the same shape and size of cross-section of the said cutters. The purpose of this plate or comb is to hold back the scraps of paste during the retreat of the cutters from the cutter-board. Owing to the peculiar arrangement or position of the said comb O, the cutter-board, and its surface-changing apron, the scraps will be caused to pass downward and be discharged from the machine by the power of gravity; and, besides, after each cutter may have become filled with the lozenges, each succeeding lozenge that may be received in it will force the mass forward and cause one of them to drop out of the front end of the cutter and upon the endless delivering-apron N, immediately under the same.

During the operation of the machine the paste will be prepared or reduced to a proper thickness and sugared on both sides, and will hang down upon the front face of the apron of the cutter-board. While it is in such position the cutters (which may be of such shape and size in cross-section as may be desirable) are forced through it by the operations of the cams of the shaft K, the recession of the cutters being effected by the springs applied to their slides, hereinbefore described. The lozenges fall out of the front ends of the cutters and upon the foremost delivery-apron or upon boards or trays laid thereon.

Having thus described my improved machine for making lozenges, as well as the mode of its operation, I would remark that in comparison with most other machines for such purpose it possesses some eminent advantages both as to simplicity of construction and to the manner in which its operates, and affords sight of the paste preparatory to its being cut into lozenges and discharged from the machine.

What I claim as my invention in such machine is as follows:

1. The combination and arrangement of the extra delivery-apron G with the main delivery-apron F, or carrier of the reducing and sugaring apparatus, and with mechanism for stamping the lozenges from the paste, the object of the said delivering-apron, when used, as set forth, with the main delivery apron or carrier, and the apparatus for reducing the paste and sugaring it on both sides, being to enable the sheet of paste to be seen on both of its sides before passing to the cutters.

2. The combination and arrangement of the delivery-apron G, the cutter-board H, the series of cutters L, and the lozenge-discharging apron N, the same not only enabling the sheet of paste to drop vertically and fall by its own weight preparatory to and after being cut, but causing the cutters to discharge the lozenges on a discharging apron or boards placed thereon, in manner as set forth.

3. The arrangement and combination of the surface changing-apron I with the cutter-board H, the delivery-apron G, the series of cutters L, and the lozenge-discharging apron N, arranged as specified.

4. The arrangement and combination of the comb-plate O with the cutters L and their stamping-board H, or device for supporting the paste while it is being stamped.

OLIVER RICE CHASE.

Witnesses:
   H. A. HOLDEN,
      *Solicitor, Birmingham, England.*
   JOHN W. HINDS,
      *His clerk.*
   J. M. G. UNDERHILL,
*Consulate of the United States, at Birmingham, in the county of Warwick.*